United States Patent [19]

Keck

[11] 4,415,230

[45] Nov. 15, 1983

[54] POLARIZATION RETAINING SINGLE-MODE OPTICAL WAVEGUIDE

[75] Inventor: Donald B. Keck, Big Flats, N.Y.

[73] Assignee: Corning Glass Works, Corning, N.Y.

[21] Appl. No.: 248,947

[22] Filed: Mar. 30, 1981

[51] Int. Cl.³ .............................................. G02B 5/172
[52] U.S. Cl. ................. 350/96.33; 350/96.30
[58] Field of Search ............... 350/96.29, 96.30, 96.33, 350/96.34; 65/3.11, 3.12

[56] References Cited

U.S. PATENT DOCUMENTS

| | | | |
|---|---|---|---|
| 4,179,189 | 12/1979 | Kaminow et al. | 350/96.33 |
| 4,184,859 | 1/1980 | Maklad | 65/2 |
| 4,274,854 | 6/1981 | Pleibel et al. | 350/96.3 X |
| 4,307,938 | 12/1981 | Dyott | 350/96.3 |
| 4,354,736 | 10/1982 | Maklad et al. | 350/96.3 X |
| 4,372,646 | 2/1983 | Strahan et al. | 350/96.33 X |

FOREIGN PATENT DOCUMENTS 2735312 2/1979 Fed. Rep. of Germany ... 350/96.33
2012983 8/1979 United Kingdom .

OTHER PUBLICATIONS

Ramaswamy et al., "Birefringence in Elliptically Clad . . . Fibers", *Appl. Optics*, vol. 18, No. 24, Dec. 1979, pp. 4080-4084.

*Primary Examiner*—John D. Lee
*Attorney, Agent, or Firm*—W. J. Simmons, Jr.

[57] ABSTRACT

A single mode optical waveguide is constructed in a manner such that the core thereof is subjected to a stress-induced birefringence. The fiber comprises an oblong core surrounded by an oblong inner cladding layer. An outer layer of stress cladding glass, which has a circular outer surface, surrounds the inner cladding layer. The TCE of the stress cladding glass is different from that of the inner cladding glass.

9 Claims, 10 Drawing Figures

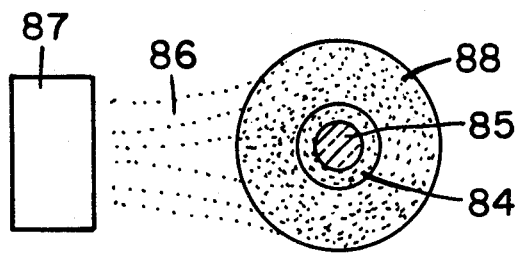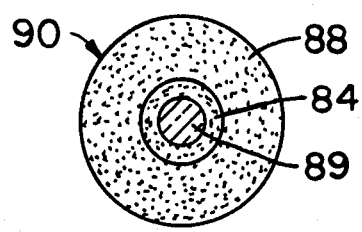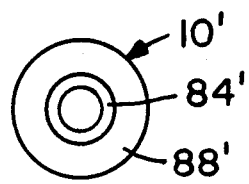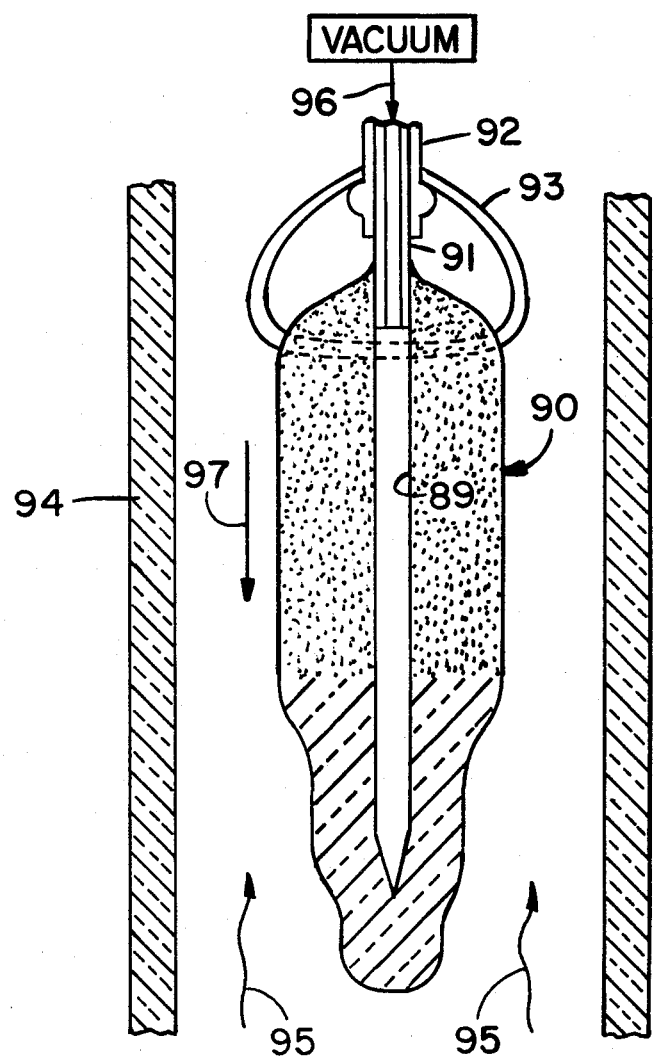

POLARIZATION RETAINING SINGLE-MODE OPTICAL WAVEGUIDE

CROSS-REFERENCE TO RELATED APPLICATION

This application is related to U.S. patent application Ser. No. 249,022 entitled "Method of Making Polarization Retaining Single-Mode Optical Waveguide," filed in the name of M. G. Blankenship et al. on even date herewith, now U.S. Pat. No. 4,360,371.

BACKGROUND OF THE INVENTION

In many applications of single mode optical waveguides, e.g. gyroscopes, sensors and the like, it is important that the propagating optical signal retain the polarization characteristics of the input light in the presence of external depolarizing perturbations. This requires the waveguide to have an azimuthal asymmetry of the refractive index profile.

A slight improvement in the polarization performance of single mode optical waveguides is achieved by distorting the fiber core symmetry as a means of decoupling the differently polarized waves. Two such optical fiber waveguides are disclosed in U.S. Pat. No. 4,184,859 and in the publication by V. Ramaswamy et al., "Influence of Noncircular Core on the Polarisation Performance of Single Mode Fibers," Electronics Letters, Vol. 14, No. 5, pp. 143-144, 1978. However, the Ramaswamy publication reports that measurements on borosilicate fibers with noncircular cores indicate that the noncircular geometry and the associated stress-induced birefringence alone are not sufficient to maintain polarization in single mode fibers.

The invention disclosed in U.K. patent application GB No. 2,012,983 A is based upon the recognition that orthogonally polarized waves are more efficiently decoupled in a waveguide that is fabricated in such a manner as to deliberately enhance stress-induced, or strain birefringence. That patent teaches that such behavior is accomplished by introducing a geometrical and material asymmetry in the preform from which the optical fiber is drawn. The strain-induced birefringence is introduced by at least partially surrounding the single mode waveguide by an outer jacket having a different thermal coefficient of expansion (TCE) than that of the waveguide and a thickness along one direction that is different from its thickness along a direction orthogonal to the one direction. For example, the preform may be a three-layered structure comprising an inner core region surrounded by a cladding layer which is in turn surrounded by an outer jacket layer having a TCE different than that of the cladding layer. Diametrically opposed portions of the outer layer are ground away, and the resultant preform is drawn into a fiber approximating a slab configuration in which the thicknesses of the outer jacket layer are different in two orthogonal directions. A similar result can be accomplished by constructing the preform from an inner core region, a cladding region and two outer jacket layers oppositely disposed along the longitudinal surface of the preform. Difficulty can be encountered in the manufacture of that type of preform since stress is built up in the outer layer. When grinding the outer layer or when cutting slots therein, the built-up stress has a tendency to cause the preform to break. Assuming that a fiber can be drawn from the preform, the stress-forming outer layer is far removed from the fiber core, and therefore, the effect of the stress on the core is minimal.

In one embodiment of GB No. 2,012,983 A represented by FIGS. 10-15, a relatively thick substrate tube forms the outer portion of the optical fiber. In order to impart to the fiber the desired characteristics, either the inner or outer surface of the substrate tube is non-circular. Because at least a portion of the substrate wall must be relatively thick, the efficiency of deposition is adversely affected. Also, since the substrate tube forms the outer, compressive layer of the fiber, commercially available tubes may not be usable in the process unless they fortuitously possess the desired expansion and/or viscosity characteristics of the resultant fiber outer layer.

In a fiber such as that illustrated in FIG. 12 of GB No. 2,012,983 A, the outer layer 60 of cladding is referred to herein as the stress cladding. It has been found that the stress $\sigma$ at the core of a circularly symmetric single mode optical waveguide fiber is equal to the product of $f \times g$ where f is a function of geometrical factors and g is a function of glass factors. The function f is given by the equation $$f = \frac{A_{sc}}{A_f} \quad (1)$$

where $A_{sc}$ is the cross-sectional area of the stress cladding and $A_f$ is the total cross-sectional area of the fiber. The function f can therefore have a value such that $0 < f < 1$. The function g is given by the equation $$g = \frac{E(\Delta \alpha)\Delta T}{2(1 - \nu)} \quad (2)$$

where E is the effective elastic modulus of the fiber, $\Delta \alpha$ is the difference between the TCE of the stress cladding and the TCE of the remainder of the fiber, $\Delta T$ is the difference between the lowest set point of the glasses of which the fiber is comprised and room temperature and $\nu$ is Poissons ratio. Since the aforementioned definition of stress $\sigma$ generally applies also to non-symmetrical fibers such as those disclosed in GB No. 2,012,983 A, it is necessary to maximize f to obtain the greatest core stress and thus obtain the greatest stress birefringence. Values of f greater than 0.9 should be achieved to provide maximum values of stress birefringence. The need to maximize function f is recognized in GB No. 2,012,983 A as evidenced by equations (7) and (8) thereof.

Another art-recognized design criteria for single mode optical waveguides is concerned with minimizing loss. A common method of forming single mode optical waveguide preforms is illustrated in FIG. 11 of GB No. 2,012,983 A which shows a plurality of vapor deposited layers on the inner surface of a substrate tube. The purity of the substrate tube is generally not as high as that of the vapor deposited glass. Therefore, the vapor deposited core glass is isolated from the substrate tube by a layer of vapor deposited optical cladding glass of sufficient thickness. For a single mode fiber having a core cross-section which is circular or nearly circular, the radius $r_s$ of the optical cladding should be at least five times the radius $r_a$ of the core. This estimate is based on the findings reported in the publication: Electronics Letters, Vol. 13, No. 15, pp. 443-445 (1977). For fibers having cores of oblong cross-section, this relationship lacks meaningful significance. In such a fiber, the extent of the optical cladding is better described in terms of its thickness. Since the size of a single mode core is related to the transmission wavelength λ, the thickness of the optical cladding can also be specified in terms of λ. The aforementioned cladding radius to core radius ratio implies that the thickness of the optical cladding be at least about 20λ. When a single mode waveguide is designed in accordance with this criteria, loss associated with cladding thickness is limited to an acceptably low value.

The following analysis of GB No. 2,012,983 A is made by taking into consideration, inter alia, the specific embodiment described in conjunction with FIGS. 10–12 thereof. The fiber of that embodiment will satisfy the requirement that the ratio $A_{sc}/A_f$ exceed 0.9 except when the substrate tube is completely filled with internal layers during the process of making the preform from which the fiber is drawn. This aforementioned exception is, of course, an impossibility. Since the substrate tube cannot be completely filled during the internal layer deposition process, the total thickness of the internal layers is limited by the internal diameter of the substrate tube. It is well known that the core diameter of a step profile single mode fiber is about 3 to 10 μm. The outside diameter of the fiber is typically about 125 μm. If the preform described in GB No. 2,012,983 A is formed in accordance with conventional practice so that the ratio $A_{sc}/A_f$ exceeds 0.9, the thickness of the optical cladding layer will be less than 20λ at conventional wavelengths. Thus, the excess fiber loss due to insufficient optical cladding thickness will not be sufficiently low for many applications.

SUMMARY OF THE INVENTION

It is therefore an object of the present invention to provide an improved single polarization single mode optical waveguide exhibiting stress-induced birefringence. Another object is to provide a method of making a polarization maintaining single mode optical waveguide which can be formed by a technique which does not weaken the preform.

The present invention relates to an optical waveguide comprising a transparent glass core having an oblong cross-sectional configuration. Disposed on the surface of the core is an eliptically-shaped layer of optical cladding glass having a refractive index greater than that of the core glass. Surrounding the eliptically-shaped layer of cladding glass there is disposed an outer layer of stress cladding glass having a temperature coefficient of expansion different from that of the eliptically-shaped cladding layer. The outer surface of the outer cladding layer is substantially circular in cross-section.

The optical waveguide of the present invention is formed by providing a tubular intermediate product comprising an inner layer of core glass surrounded by a first cladding glass layer. The intermediate product is collapsed to form a flattened preform foreproduct wherein the core glass has been transformed into a unitary layer having an elongated cross-section. This core layer is surrounded by an inner cladding layer which now has an oblong cross-sectional configuration. A layer of flame hydrolysis-produced soot is deposited on the outer surface of the inner cladding layer, the TCE of the soot being different from that of the inner cladding glass. The resultant article is heated to consolidate the soot into an outer cladding glass layer, thereby forming a solid glass draw blank which can be drawn into an optical waveguide fiber.

In accordance with one method of forming the tubular intermediate product, a plurality of layers are deposited by a chemical vapor deposition technique on the inner surface of a substrate tube which is formed of a glass of lower purity than the glass layers deposited therein. The innermost layer forms the core and the next adjacent layer, which is thicker than the core layer, forms the optical cladding. This method of forming the fiber permits the thickness of the optical cladding to be greater than 20λ at the operating wavelength. The core is thus adequately isolated from the impure substrate tube.

In another embodiment, the tubular intermediate product is formed by a flame oxidation technique. Reactant vapors are fed to a burner where they are oxidized in a flame to form glass soot which is deposited on a cylindrical mandrel. The first applied soot layer forms the core material of the resultant fiber. At least one additional layer of soot is applied to the first layer to form the inner cladding. After the mandrel is removed, the resultant hollow soot preform can be consolidated to form a hollow glass tube which is thereafter heated on opposite sides to cause it to collapse flat. Alternatively, a low pressure can be applied to the aperture of the soot preform to cause it to collapse flat during consolidation.

Both of these methods permit the formation of a very thick stress cladding layer so that the ratio $A_{sc}/A_f$ is greater than 0.9.

BRIEF DESCRIPTION OF THE DRAWING

FIG. 7 illustrates a flame hydrolysis process for forming a preform including a core portion and an inner cladding portion.

FIG. 8 shows the soot preform of FIG. 7 after the mandrel has been removed.

FIG. 9 shows the consolidated preform.

FIG. 10 is a schematic representation of a consolidation furnace which may be used to consolidate the preform of FIG. 8.

DESCRIPTION OF THE PREFERRED EMBODIMENT

Figure 1:
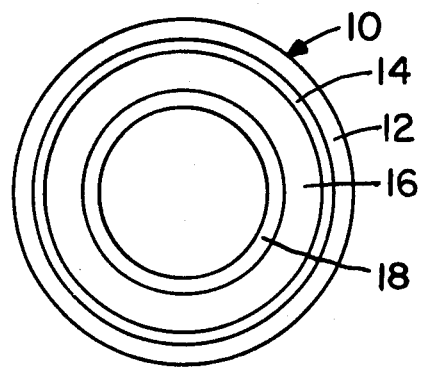
FIG. 1 is a cross-sectional view of an intermediate product which is employed in the formation of the preform from which the fiber of the present invention is formed.

The intermediate product 10 illustrated in FIG. 1 is formed by a well-known embodiment of the chemical vapor deposition technique whereby one or more layers of glass are formed on the inside surface of a substrate tube which later forms at least a portion of the cladding material. The reactant vapor, together with an oxidizing medium, flows through hollow, cylindrical substrate tube 12. The substrate and the contained vapor mixture are heated by a source that moves relative to the substrate in a longitudinal direction, whereby a moving hot zone is established within the substrate tube 12. A suspension of particulate material, which is produced within the hot zone, travels downstream where at least a portion thereof comes to rest on the inner surface of tube 12 where it is fused to form a continuous glassy deposit. Such process parameters as temperature, flow rates, reactants and the like are discussed in U.S. Pat. No. 4,217,027.

A thin barrier layer 14 of pure silica or silica doped with an oxide such as $B_2O_3$ is sometimes initially deposited on the inner surface of tube 12 which is usually formed of silica or a high silica content glass, the purity of which is lower than that of the vapor-deposit layers formed therein. The barrier layer prevents the migration of hydroxyl ions or other light absorbing impurities from tube 12 into optical cladding layer 16. In order to reduce light transmission loss caused by the impurity of the substrate tube to an acceptably low level, the thickness of layer 16 is made sufficiently great that the thickness of the optical cladding layer in the resultant fiber is greater than 20λ. Since barrier layer 14 is optional, it is not shown in FIGS. 3-6. The optical cladding layer is a relatively thick layer of glass having a relatively low refractive index. It conventionally comprises pure silica or silica doped with a small amount of a dopant oxide for the purpose of lowering processing temperatures. The addition of a small amount of $P_2O_5$ to the deposited silica cladding layer is taught in the publication: S. Sentsui et al., "Low Loss Monomode Fibers With $P_2O_5$-$SiO_2$ Cladding in the Wavelength Region 1.2-1.6 $\mu m$," 5th European Conference on Optical Communication, Amsterdam, September, 1979. The use of $P_2O_5$ along with either $B_2O_3$ or F in the deposited silica cladding layer is taught in the publication: B. J. Ainslie et al., "Preparation of Long Length of Ultra Low-Loss Single-Mode Fiber," Electronics Letters, July 5, 1979, Vol. 15, No. 14, pp. 411-413. The use of such dopants has resulted in a deposition temperature of about 1500° C., which is approximately 200° C. lower than the temperature required to deposit a pure fused silica cladding layer. Upon completion of optical cladding layer 16, a relatively thin layer 18 of core material is deposited on the inner surface thereof. Core layer 18 consists of a high purity glass having a refractive index greater than that of cladding layer 16. Layer 18 conventionally comprises silica doped with a low-loss oxide for the purpose of increasing the refractive index. Many dopants have been employed in the fabrication of the cores of single mode optical waveguide fibers, $GeO_2$ presently being preferred. Single mode waveguides having losses less than 1 dB/km in the infra red region comprise cores formed of $SiO_2$ doped with $GeO_2$ as reported in the aforementioned Sentsui et al. and Ainslie et al. publications. The resultant intermediate product 10 contains an aperture 20.

For operation at wavelengths in the range between 1.1 and 1.8 $\mu m$ a preferred intermediate product could be constructed in accordance with the teachings of U.S. patent application Ser. No. 157,518 filed June 9, 1980 in the name of P. E. Blaszyk et al. That application teaches the formation of a $P_2O_5$ doped $SiO_2$ cladding layer on the inner surface of a borosilicate substrate tube followed by a thin layer of pure $SiO_2$ to prevent the $P_2O_5$ from diffusing into the $GeO_2$ doped $SiO_2$ core which is deposited on the inner surface of the pure $SiO_2$ layer.

For purposes of the present invention it is merely required that intermediate product 10 comprise an inner layer of core glass surrounded by a layer of lower refractive index optical cladding glass. Core 18 could be deposited directly on the inner surface of tube 12, for example, if tube 12 were formed of high purity glass. As used herein, the term "inner cladding layer" means tube 12 and any other layer or layers of glass surrounding core layer 18 in intermediate product 10.

It is an advantage of the present method that commercially available glass tubes may be employed for substrate tube 12. The cross-sectional area of cladding layer 16 can be made much greater, e.g. more than twice that of substrate tube 12 so that the physical characteristics of deposited layer 16, rather than those of tube 12, predominate in the determination of characteristics such as the thermal coefficient of expansion of the inner cladding. In such a situation, the cross-sectional area of the substrate tube is so small relative to that of the entire resultant fiber that the physical characteristics thereof remain essentially insignificant.

Figure 2:
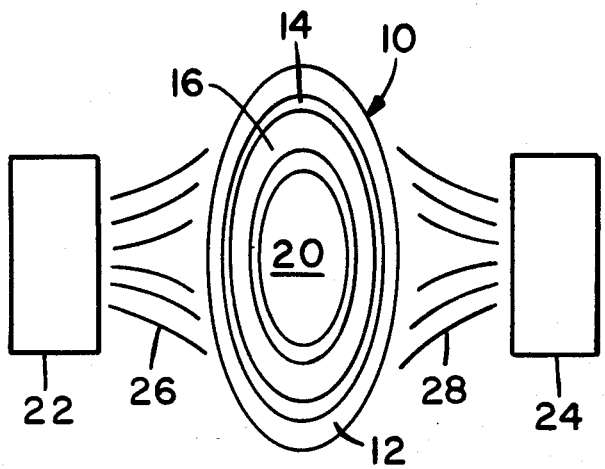
FIG. 2 shows an apparatus for collapsing the intermediate product of FIG. 1.

Intermediate product 10 can be collapsed in the manner illustrated in FIG. 2. Burners 22 and 24 produce flames 26 and 28, respectively which are directed onto opposite sides of intermediate product 10. During this process intermediate product 10 may be mounted in the glass lathe (not shown) in which it was mounted during the formation of layers 14 and 16. During the collapse process illustrated in FIG. 2, lathe rotation is halted so that only opposite sides of product 10 are heated. The collapsing step is preferably done under a controlled internal pressure as taught in U.S. Pat. No. 4,154,591. During this step, the heat source must cover a sufficiently broad axial region of intermediate product 10 to permit collapse thereof. Alternatively, a single heat source may be employed in the manner described in U.S. Pat. No. 4,184,859, whereby first one side and then the other is collapsed.

Complete collapse of the intermediate product 10 results in preform foreproduct 30 in which opposite sides of core layer 18 have been combined to form a core portion 32 which is elongated in cross-section. Very large core aspect ratios can thus be achieved. The core is surrounded by inner cladding portion 34 and substrate portion 36, both of which have an oblong geometry.

Figure 4:
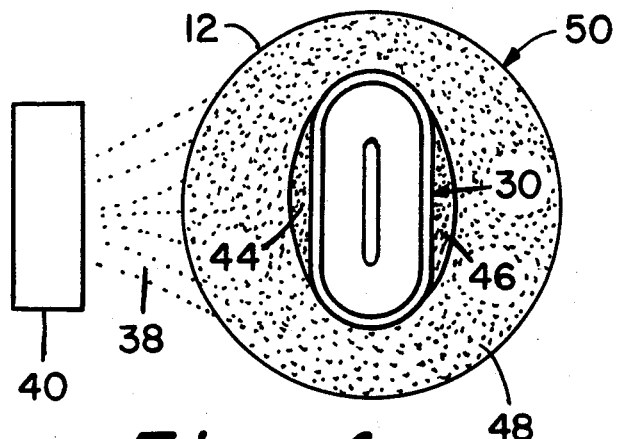
FIGS. 3 and 4 are schematic representations of an apparatus for forming a composite preform having an outer soot coating.
Figure 3:
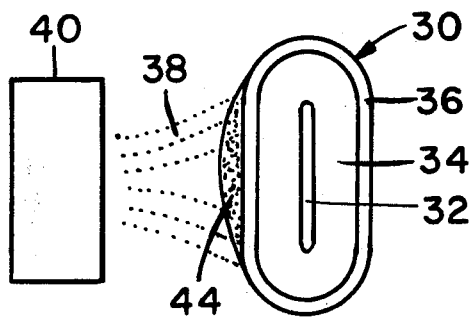

Preform foreproduct 30 is then provided with a cladding portion, the outer surface of which is substantially circular in cross-section. The surface of foreproduct 30 is prepared in a conventional manner prior to deposition of the outer cladding. The surface of preform foreproduct 30 is kept clean after the firepolishing step which resulted in the collapse of intermediate product 10 by inserting foreproduct 30 into a clean sealed bag such as a polyethylene bag. If foreproduct 30 is handled or permitted to become dirty, several cleaning steps are typically required. It is washed in deionized water and then washed in an isopropyl alcohol bath. It is then etched in HF to remove a few microns of glass or about 1% of the article weight. Then foreproduct 30 is rinsed in deionized water, degreased with isopropyl alcohol and placed in a clean polyethylene bag. Soot of the desired glass composition is deposited on foreproduct 30 by a conventional flame hydrolysis process similar to that disclosed in U.S. Pat. Nos. 3,737,292 and 4,165,223. Referring to FIGS. 3 and 4, there is shown an apparatus which is now conventionally employed in the manufacture of low-loss optical waveguide fibers. A flame 38 containing glass soot emanates from a flame hydrolysis burner 40 to which fuel, reactant gas and oxygen or air are supplied. Burners such as those disclosed in U.S. Pat. Nos. 3,565,345; 3,565,346; 3,609,829 and 3,698,936 may be employed. Liquid constituents required to form the glass soot can be delivered to the burner by any one of the many well known reactant delivery systems known in the prior art. Reference is made in this regard to teachings of U.S. Pat. Nos. 3,826,560; 4,148,621 and 4,173,305. Excess oxygen is supplied to the burner so that the reactant vapors are oxidized within flame 38 to form the glass soot which is directed toward foreproduct 30.

In accordance with one technique for forming the outer cladding layer, longitudinal strips 44 and 46 are initially deposited on the flattened sidewalls of foreproduct 30 to accelerate the formation of a circular outer cladding. With the lathe halted, burner 40 makes a sufficient number of longitudinal passes to form a soot layer 44. Foreproduct 30 is rotated 180° and a second soot layer 46 is deposited opposite the first one as shown in FIG. 4. Outer layer 48 of cladding soot is then deposited by rotating foreproduct 30 while burner 40 traverses it longitudinally.

The steps of depositing strips 44 and 46 of cladding glass may be omitted without affecting to too great an extent the geometry of the resultant fiber. If cladding layer 48 is deposited directly upon foreproduct 30, the soot stream from the burner will deposit a greater amount of soot when the flat side walls of foreproduct 30 are facing the burner than when the rounded portions thereof are facing the burner since soot collection efficiency is a function of target size. This tends to decrease the noncircularity of the soot blank cross-section as layer 48 is built up. Substantial circularity should be achieved when the outside diameter of layer 48 is sufficient, relative to the size of the core, to enable the resultant fiber to function as a single-mode fiber. The thickness of layer 48 must be sufficient to cause the ratio $A_{sc}/A_f$ in the resultant fiber to exceed 0.9.

The flame hydrolysis-produced cladding layer is porous in form and must be heated to fuse or consolidate it into a glass layer free from particle boundaries. Consolidation is preferably accomplished by gradually inserting the composite body 50 into a consolidation furnace in the manner taught in U.S. Pat. No. 3,933,454. The resultant glass draw blank 56 may not be circular if layers 44 and 46 are not applied or if they are applied in such a fashion that they do not balance the initial noncircularity of preform foreproduct 30. The amount that the outer surface of consolidated blank 56 deviates from circularity decreases with increasing amounts of outer cladding 48.

Figure 5:
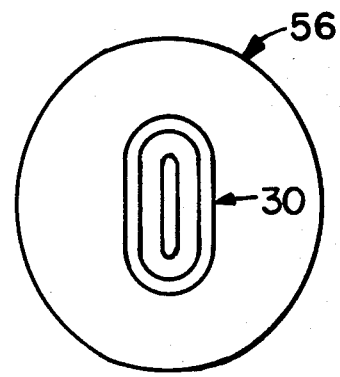
FIG. 5 is a cross-sectional view of a draw blank formed by consolidating the composite preform of FIG. 4.
Figure 6:
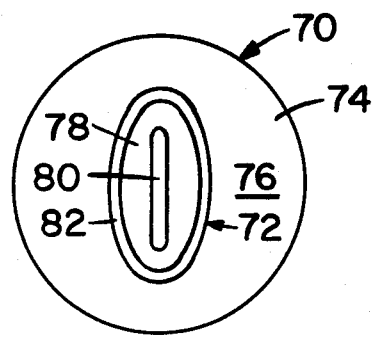
FIG. 6 is a cross-sectional view of a single-mode single polarization fiber drawn from the draw blank illustrated in FIG. 5.

Draw blank 56 of FIG. 5 is inserted into a draw furnace wherein at least one end thereof is heated to a temperature that is sufficiently high to permit fiber 70 of FIG. 6 to be drawn therefrom in accordance with conventional practice. During the drawing of fiber 70, surface tension tends to round the outer surface thereof.

Alternative processes for forming an intermediate product are illustrated in FIGS. 7 through 10. As shown in FIG. 7, a first coating 84 of glass soot is applied to cylindrical mandrel 85 by a conventional flame hydrolysis process such as that referred to hereinabove. A flame 86 containing glass soot emanates from flame hydrolysis burner 87 and impinges upon mandrel 85. After a coating 84 of core glass is formed on mandrel 85, the composition of the reactant gas fed to burner 87 is changed and a second coating 88 of inner cladding glass is applied to the outer surface of first coating 84. The refractive index of coating 84 is greater than that of coating 88. The physical characteristics of coating 88, such as the TCE thereof, are selected to impart the required amount of stress to the inner cladding of the resultant optical waveguide fiber.

After coating 88 has achieved the desired thickness, the mandrel is removed as shown in FIG. 8 to form a porous preform 90 having an aperture 89. The resultant hollow soot preform can then be consolidated in the manner described hereinabove to form hollow intermediate product 10' as shown in FIG. 9. Intermediate product 10' can be collapsed in the manner illustrated in FIG. 2 and further processed in the manner described in conjunction with FIGS. 3 through 6 to form a polarization retaining single-mode optical waveguide fiber.

The porous preform 90 illustrated in FIG. 8 can alternatively be consolidated in the manner illustrated in FIG. 10 to form a preform foreproduct having a high aspect ratio core in a single processing step. After mandrel 85 has been removed from the soot preform, a tube 91 is inserted into one end of the preform. The preform is then suspended from a tubular support 92 by two platinum wires, of which only wire 93 is shown. The end of gas conducting tube 91 protrudes from tubular support 92 and into the adjacent end of preform 90. The preform is consolidated by gradually inserting it into consolidation furnace 94 in the direction of arrow 97. The preform should be subjected to gradient consolidation, whereby the bottom tip thereof begins to consolidate first, the consolidation continuing up the preform until it reaches that end thereof adjacent to tubular support 92. During the consolidation process a flushing gas such as helium, oxygen, argon, neon, or the like, or mixtures thereof flow through the consolidation furnace as indicated by arrows 95. Prior to the time that preform 90 begins to consolidate, drying gases may be flowed into aperture 89 in the manner taught in U.S. Pat. No. 4,125,388. During the time that the initial tip of the preform begins to consolidate, the pressure in aperture 89 is reduced relative to that outside the preform. This may be accomplished by connecting a vacuum system to gas conducting tube 91 by line 96. As preform 90 is inserted into the consolidation furnace in the direction of arrow 97 the low pressure within aperture 89 causes aperture 89 to collapse flat, beginning in the region of the initially consolidated tip portion of the preform. As the remainder of the preform becomes consolidated, the remainder of the aperture continues to collapse flat. Thus, in a single consolidation step, porous soot preform 90 having aperture 89 therein can be consolidated and simultaneously have the aperture collapsed flat to form a preform foreproduct of the type illustrated by numeral 30 in FIG. 3.

Referring again to FIGS. 4–6, the composition of soot layer 48 (and that of strips 44 and 46, if they are deposited) is such that the TCE of the resultant cladding layer 74 is much greater than or much less than the TCE of the remainder of fiber 70. It is known that portion 72 (comprising core 80, substrate tube 82 and any layers forming inner cladding 78) will be caused to be in tension if the TCE of the outer or "stress cladding" layer 74 is lower than the effective TCE of portion 72. Conversely, portion 72 will be caused to be in compression if the effective TCE thereof is lower than that of stress cladding layer 74. See the publication: S. T. Gulati and H. E. Hagy, American Ceramic Society 61

260 (1978). Moreover, a stress distribution will exist within the waveguide core 80 in which $\sigma_x > \sigma_y$, where $\sigma_x$ and $\sigma_y$ are the stresses in the core region parallel to and perpendicular to the long axis of the core cross-section. Furthermore, this stress difference will increase as the aspect ratio of the core region increases. This stress differential will produce the desired birefringence.

A stress of 20-40 kpsi in the core is needed to provide the required birefringence. With the aspect ratios achievable by the processes described hereinabove, the TCE difference between the inner cladding and the outer stress cladding should be greater than $1 \times 10^{-7}/°C$. Following are two theoretical examples wherein the glass compositions of the various parts of the fibers are chosen so that the fiber core is in compression and tension, respectively.

A fiber of the type shown in FIG. 6 is formed of the glass compositions given in Table 1. The TCE of each composition is also listed.

TABLE 1

|  | Composition (wt. %) | | TCE ($\times 10^{-7}/°C$.) |
| --- | --- | --- | --- |
|  | GeO$_2$ | SiO$_2$ |  |
| Core 80 | 15 | 85 | 13 |
| Inner clad 78 |  | 100 | 5 |
| Tube 82 |  | 100 | 5 |
| Outer clad 74 | 30 | 70 | 23 |

The fiber defined by Table 1 has a core that is in compression and an outer cladding which is in tension. Although the core is adequately stressed, this fiber may be undesirable from a strength standpoint. Such a fiber could be strengthened by adding to the outer surface thereof a further low expansion cladding layer of SiO$_2$, for example.

A fiber of the type illustrated in FIG. 6 could be formed of the materials specified in Table 2 in order to put the core into a state of tension.

TABLE 2

|  | Composition (wt. %) | | | | TCE ($\times 10^{-7}/°C$.) |
| --- | --- | --- | --- | --- | --- |
|  | GeO$_2$ | P$_2$O$_5$ | SiO$_2$ | TiO$_2$ |  |
| Core 80 | 15 | 1.5 | 83.5 |  | 15 |
| Inner clad 78 |  | 1.5 | 98.5 |  | 6 |
| Outer clad 74 |  |  | 93 | 7 | 0 |

This type of fiber, in which the core is in tension, is preferred since the outer cladding will be in compression, a condition tending to strengthen the fiber.

I claim:

1. A polarization retaining single mode optical waveguide fiber comprising
   a core of transparent glass, said core having an oblong cross-sectional configuration,
   an oblong inner cladding layer disposed on the surface of said core, said inner cladding including an optical cladding layer of high purity glass surrounded by a layer of lower purity glass, the refractive index of said core glass being greater than that of said high purity and said lower purity cladding glasses, and
   an outer layer of stress cladding glass surrounding said inner cladding, said stress cladding glass having a thermal coefficient of expansion different from that of said inner cladding glass, the outer surface of said outer layer being substantially circular in cross-section.

2. A fiber in accordance with claim 1 wherein the ratio of the cross-sectional area of the outer cladding layer to that of the entire fiber is greater than 0.9.

3. A fiber in accordance with claim 2 wherein the thickness of the optical cladding layer is greater than twenty times the wavelength at which the fiber is to be operated.

4. A fiber in accordance with claim 1 wherein the difference between the coefficients of expansion of said stress cladding glass and said inner cladding glass is greater than $1 \times 10^{-7}/°C$.

5. A fiber in accordance with claim 4 wherein the thermal coefficient of expansion of said inner cladding glass is greater than that of said stress cladding glass.

6. A fiber in accordance with claim 1 wherein the optical purity of said outer layer of stress cladding glass is higher than that of the layer of low purity glass of said oblong inner cladding layer.

7. A polarization retaining single mode optical waveguide fiber for use at at least one wavelength $\lambda$, said fiber comprising
   a core of transparent glass, said core having an oblong cross-sectional configuration,
   an oblong inner cladding layer disposed on the surface of said core, said inner cladding including an optical cladding layer of high purity glass, the refractive index of which is lower than that of said core glass, the thickness of said optical cladding being greater than 20$\lambda$, and
   an outer layer of stress cladding glass surrounding said inner cladding layer, said stress cladding glass having a thermal coefficient of expansion different from that of said inner cladding glass, the outer surface of said outer layer being substantially circular in cross-section, the ratio of the cross-sectional area of the outer cladding layer to that of the entire fiber being greater than 0.9.

8. A fiber in accordance with claim 7 wherein the difference between the thermal coefficients of expansion of said stress cladding glass and said inner cladding glass is greater than $1 \times 10^{-7}/°C$.

9. A fiber in accordance with claim 8 wherein the thermal coefficient of expansion of said inner cladding glass is greater than that of said stress cladding glass.

* * * * *